United States Patent
Kuhhirte (10) Patent No.: US 9,891,971 B1
(45) Date of Patent: Feb. 13, 2018

(54) AUTOMATING THE PRODUCTION OF RUNBOOK WORKFLOWS

(75) Inventor: William F. Kuhhirte, Redington Shores, FL (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1118 days.

(21) Appl. No.: 12/826,833

(22) Filed: Jun. 30, 2010

(51) Int. Cl.
*G06F 11/00* (2006.01)
*G06F 11/07* (2006.01)

(52) U.S. Cl.
CPC ........ *G06F 11/0709* (2013.01); *G06F 11/079* (2013.01)

(58) Field of Classification Search
USPC .............................................. 714/25, 26, 46
See application file for complete search history.

(56) References Cited

U.S. PATENT DOCUMENTS

| | | | | |
|---|---|---|---|---|
| 7,263,632 | B2 * | 8/2007 | Ritz | G06F 11/0709 714/25 |
| 2002/0107919 | A1 * | 8/2002 | Arai | G06F 11/079 709/203 |
| 2005/0223285 | A1 * | 10/2005 | Faihe | G06F 11/0709 714/25 |
| 2008/0072105 | A1 * | 3/2008 | Fujibayashi | 714/47 |
| 2009/0083221 | A1 * | 3/2009 | Pingali | G06Q 10/06398 |
| 2009/0177910 | A1 * | 7/2009 | Liu et al. | 714/2 |
| 2010/0042449 | A1 * | 2/2010 | Thomas | 705/7 |
| 2010/0211815 | A1 * | 8/2010 | Mankovskii et al. | 714/2 |
| 2010/0229022 | A1 * | 9/2010 | Anand | G06F 11/079 714/2 |

* cited by examiner

*Primary Examiner* — Sarai E Butler
(74) *Attorney, Agent, or Firm* — R. Kevin Perkins; Krishnendu Gupta (57) ABSTRACT

A method and program product for receiving an indication of a particular root cause associated with an error condition in an information technology (IT) system, electronically capturing activity of an operator for the IT system, automatically generating a workflow portion for a generic runbook, and storing the generic runbook in a manner that allows retrieval of the generic runbook.

20 Claims, 6 Drawing Sheets

AUTOMATING THE PRODUCTION OF RUNBOOK WORKFLOWS

A portion of the disclosure of this patent document may contain command formats and other computer language listings, all of which are subject to copyright protection. The copyright owner has no objection to the facsimile reproduction by anyone of the patent, document or the patent disclosure, as it appears in the Patent and Trademark Office patent, file or records, but otherwise reserves all copyright rights whatsoever.

FIELD OF THE DISCLOSURE

The present disclosure generally relates to the field of runbook automation (RBA).

BACKGROUND

A runbook is a printed or electronic document containing the operational procedures that need to be followed to manage or supervise a computer system or network. Runbooks are often used in information technology departments of commercial companies and network operations centers (NOCs) as a reference for system administrators. Runbooks are frequently created by top-tier managed service providers. Typically, a runbook will contain the procedures to begin, stop, and supervise the system. Runbooks may include procedures for every anticipated scenario and generally use step-by-step decision trees to determine the effective course of action applied to a particular scenario. For example, in the event operational software malfunctions, a system administrator could consult a runbook to follow a detailed step-by-step list of diagnostic and corrective actions to be taken. A workflow is typically a sequence of connected steps. Generally, a runbook may be defined as a collection of discrete workflows. Conventionally, runbook automation is the ability to define, manage, orchestrate and report on workflows. Typically, RBA processes support system and network operational processes but are not constrained by definition.

Information technology (IT) systems continue to grow more complicated and interconnected, requiring rapid responses and detailed expert knowledge for even basic operations and troubleshooting. Accordingly, attempts are being made in industry to apply intelligent automation and integration to effectively manage IT systems.

BRIEF DESCRIPTION OF THE DRAWINGS

Objects, features, and advantages of embodiments disclosed herein may be better understood by referring to the following description in conjunction with the accompanying drawings. For clarity, not every element may be labeled in every figure. The drawings are not necessarily to scale, emphasis instead being placed upon illustrating embodiments, principles, and concepts.

DETAILED DESCRIPTION OF THE EMBODIMENT(S)

Conventional runbooks are generally produced in a format that is not suitable for automation. In most cases additional effort is required to convert a runbook to a series of automated steps. Typically, this conversion process is not normally performed by the person that created the runbook. As, a runbook automation workflow is generally not in a format consumable by humans, but one readable by computers, to translate the runbook from a human format to a automatable format may require programming expertise. Thus, the conventional process for producing runbook automation can be both time consuming and expensive. Embodiments disclosed herein deviate from and improve upon conventional processes for producing runbooks.

Because of the complexity embodied in the systems described in the runbook and the rate of change, it is highly likely that any given runbook needs constant upkeep and may be incomplete at the time of any given failure. This flaw is fundamental to the standard mechanisms of creating an automating runbooks and is the core of this specification.

Generally, Root-Cause Analysis (RCA) may be referred to herein as the process by which multiple observable problems, incidents, or erroneous conditions may be logically grouped. As well, a root cause may include either a logical grouping of such problems or incidents or a problem, incident, or erroneous condition where such a grouping has not occurred.

Subject matter disclosed herein provides methods usable for generating runbooks. In some embodiments, the method may be performed at a computer system programmed to perform the method. In a first particular embodiment, the computer system receives an indication of an error condition in an IT system. The computer system electronically captures activity of an operator for the IT system useful for remedying error. In some embodiments, the remedy may be to correct the root cause of the error. In further embodiments, the computer system automatically generates a workflow portion for a generic runbook to make the generic runbook useful for remedying errors. In some embodiments, a generic run-book may be generated to fix similar errors. In some cases, the remediation of the error will entail the remediation of the root cause of the error. In at least one embodiment, generating the workflow portion is at least partially based on the captured activity. In some embodiments, the computer system stores the generic runbook in a manner that allows retrieval of the generic runbook at least partially based on a similar error.

Subject matter disclosed herein provides storage media comprising instructions that, when executed by a computer system, enable the computer system to perform operations usable for generating runbooks. In a second particular embodiment, the computer system receives an indication of a particular root cause associated with an error condition in an IT system. The computer system retrieves a stored runbook associated with an error or root cause and executes the retrieved runbook. The computer system determines that executing the retrieved runbook does not remedy the error or corresponding root cause. The computer system captures activity of an operator for the IT system useful for remedying the error, which may correspond to a particular root cause. The computer system automatically generates a workflow portion for the retrieved runbook. Generating the workflow portion is at least partially based on the captured activity, of the operator. The computer system updates the retrieved runbook with the automatically generated workflow portion to generate an updated runbook useful for remedying root causes similar to the error. The computer system stores the updated runbook in a manner that allows retrieval of the updated runbook at least partially based on a root cause similar to the particular root cause.

Subject matter disclosed herein provides computer systems usable for generating runbooks. In a third particular embodiment, a computer system comprises a processor, a memory component that stores instructions associated with an application executable by the processor. An interconnect couples the processor and the memory component, enabling the computer system to execute the application and perform operations usable for generating runbooks. For example, the computer system may perform the operations discussed above with respect to the second particular embodiment.

Figure 1:
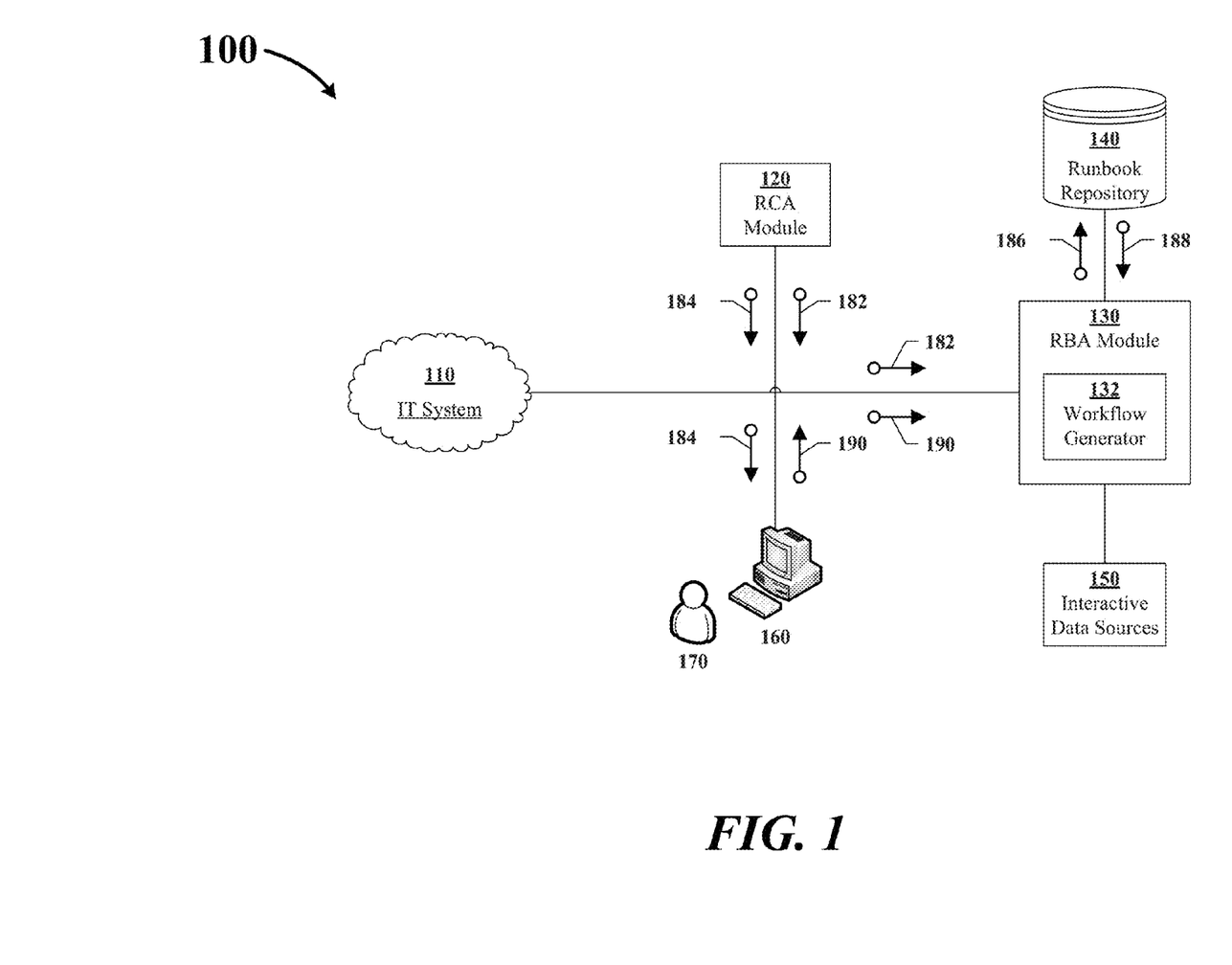
FIG. 1 is an illustration of a system including components useful for runbook automation.

FIG. 1 is an illustration of a system 100 including components useful for runbook automation. The system 100 includes an IT system 110, a root cause analysis (RCA) module 120, a RBA module 130, and an operator workstation 160. The IT system 110 may comprise a data center, a communication system, or an internet protocol (IP) network, for example. The RCA module 120 is communicatively connected to the IT system 110 and provides root cause analysis for the IT system 110. In particular embodiments, the RCA module 120 provides automated root cause analysis. For example, the IT system 110 may be a virtualized data center and the RCA module 120 may include an EMC Smarts Server Manager that provides automated root cause analysis to the virtualized data center. The RBA module 130 includes a workflow generator 132. The RBA module 130 is communicatively connected to the RCA module 120 and the IT system 110. The RBA module 130 is also communicatively connected to a runbook repository 140 and interactive data sources 150. The operator workstation 160 is communicatively connected to the IT system 110, the RCA module 120, and the RBA module 130. In particular embodiments, the operator workstation 160 includes software enabling the operator 170 to monitor activity at and interact with the IT system 110, the RCA module 120, and the RBA module 130.

During operation, the IT system 110 may create an error condition that is detected by the RCA module 120. In some embodiments, the error may be caused by the software configuration of the switch such as when software inside the switch shut down the port, the administrator has shut down an incorrect port. In other embodiments, the switches may have shut down when the software processes inside the switch detected an error. In further embodiments, there may be an etherChannel misconfiguration which may cause a spanning-tree process to shut down the port on the side configured for EtherChannel. In alternative embodiments, a duplex mismatch may cause an error. In other embodiments, a Bridge Protocol Data Unit (BPDU) port guard may cause an error such as when a switch notices a BPDU coming into a port that has PortFast enabled. In additional embodiments, errors may be due to Unidirection link detection, native VLAN mismatch, or hardware switch failure. The collection of those conditions, their detection, and possible resolution are exemplary embodiments of control paths within the same workflow.

In particular embodiments, the RCA module 120 automatically performs a root cause analysis and determines the root cause of the error condition. The RCA module 120 may communicate an indication 182 of the root cause to the RBA module 130. In particular embodiments, the RCA module 120 also communicates an indication 184 of the root cause to the operator workstation 160.

In particular embodiments, the RBA module 130 receives the indication 182 of the particular root cause associated with the error condition in the IT system 110. The RBA module may send a request 186 to the runbook repository 140 to determine whether there exists in the runbook repository 140 a runbook workflow corresponding to the root cause of the error condition in the IT system 110. The runbook repository 140 may send a response 188 to the RBA module 130. The response may include a runbook workflow corresponding to the root cause or may include an indication that no runbook workflow exists corresponding to the root cause.

In particular embodiments, the response 188 from the runbook repository 140 includes an indication that no runbook workflow exists corresponding to the root cause of the error condition in the IT system 110. The RBA module may create a new runbook workflow to correspond to the root cause of the error condition in the IT system 110. In particular embodiments, the RBA module 130 captures activity of the operator useful for remediating the root cause corresponding to the error condition in the IT system 110. The captured activity may include, for example, recorded keystrokes entered on a keyboard and selections made on a display using a computer mouse. In particular embodiments, capturing the activity of the operator comprises recording what the operator 170 enters into the operator workstation 160 to remedy the root cause corresponding to the error condition in the IT system 110. In particular embodiments, the operator workstation sends a recording 190 of the captured activity to the RBA module 130. In alternative embodiments, RBA Module 130 may indicate to workstation 160 that no workflow exists and request that workstation 160 enter a workflow.

In particular embodiments, the workflow generator 132 of the RBA module 130 automatically generates a new workflow portion for the runbook. The generation of the workflow portion is at least partially based on the captured activity. The workflow generator 132 may generalize the workflow portion so that the workflow portion applies to root causes that are similar to the root cause corresponding to the error condition in the IT system 110. For example, if the root cause is a particular server in a data center that is non-responsive, the workflow generator 132 may create a workflow portion that can be used when any server in the data center is non-responsive—not just the server that is currently non-responsive. The workflow generator 132 may use a semantic model and base the generating of the workflow portion at least partially on the semantic model. In particular embodiments, the workflow generator 132 base the generating of the workflow portion at least partially on a state machine. Each procedure in the generated workflow portion may represent a node in the state machine model. The workflow generator 132 may update the runbook workflow with the automatically generated workflow portion to generate an updated runbook useful for remedying root causes similar to the particular root cause. In particular embodiments, the RBA module stores the updated runbook in the runbook repository 140. The updated runbook may be stored in the runbook repository 140 in a manner that allows retrieval of the updated runbook at least partially based on a root cause similar to the root cause corresponding to error condition in the IT system 110. For example, the updated runbook may be retrieved by the RBA module 130 when notified by the RCA module 120 of a root cause that is different than, but similar to, the root cause corresponding to the error condition in the IT system 110.

In particular embodiments, the response 188 from the runbook repository 140 includes a runbook corresponding to the root cause of the error condition in the IT system 110. The RBA module may execute the retrieved runbook to remedy the root cause corresponding to the error condition in the IT system 110. In particular embodiments, the RBA module 130 determines that executing the retrieved runbook does not remedy the particular root cause. The root cause may be remedied when the error condition associated with the root cause is removed. The RBA module 130 may notify the operator 170 that executing the runbook did not remedy the root cause. In particular embodiments, the RBA module 130 may identify that the workflow is incomplete for the root cause. This may indicate that a previously un-encountered failure scenario has occurred and that to resolve the issue would require a new portion of the workflow. In particular embodiments, the RBA module 130 captures activity of the operator useful for remedying the root cause corresponding to the error condition in the IT system 110. The captured activity may include, for example, recorded keystrokes entered on a keyboard and selections made on a display using a computer mouse. In particular embodiments, capturing the activity of the operator comprises recording what the operator 170 enters into the operator workstation 160 to remedy the root cause corresponding to the error condition in the IT system 110. In particular embodiments, the operator workstation sends a recording 190 of the captured activity to the RBA module 130.

Figure 2:
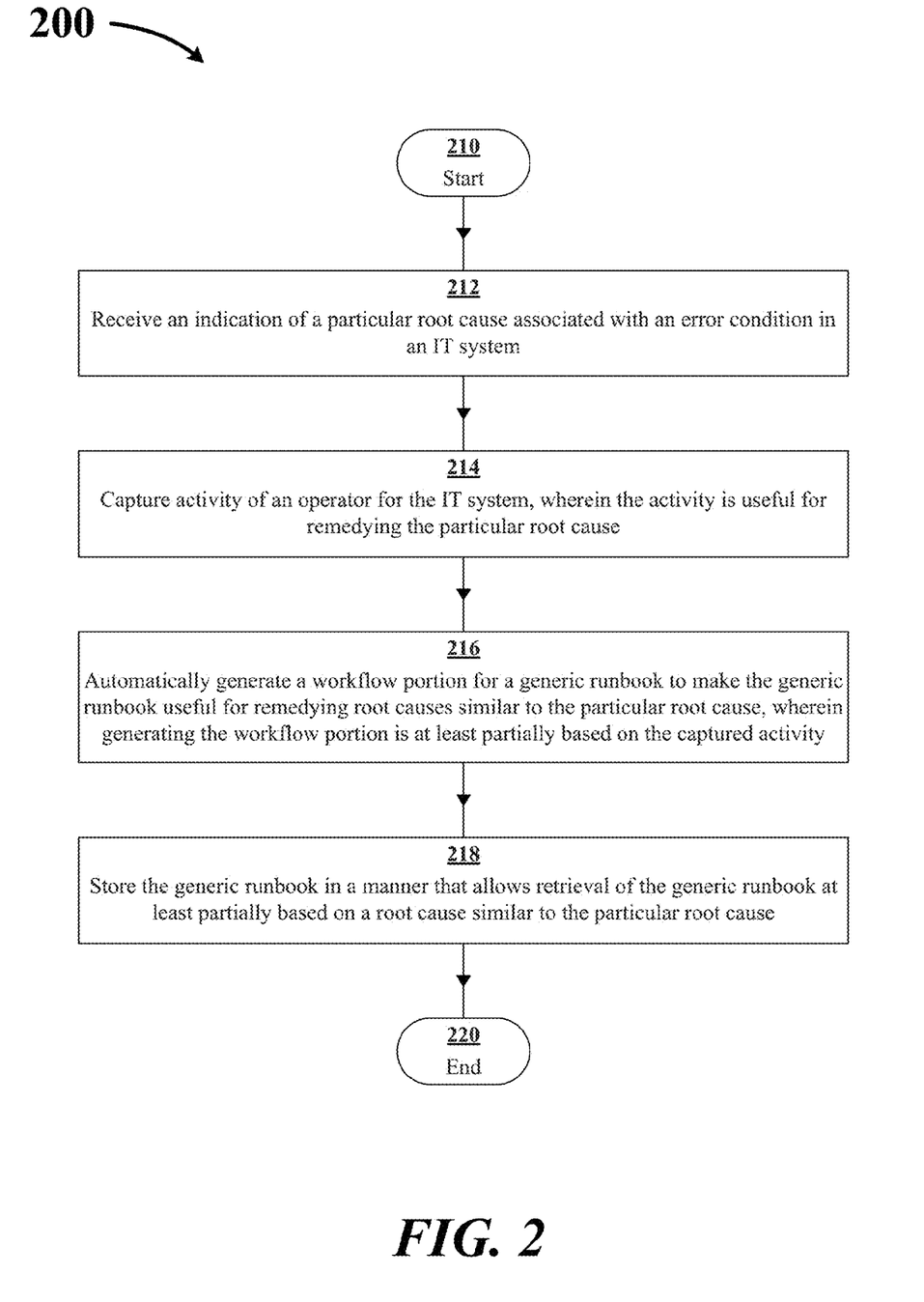
FIG. 2 shows a flow chart of a first process useful for runbook automation.

FIG. 2 shows a flow chart of a process 200 useful for runbook automation. The process 200 may be performed by a computer system, such as the RBA module 130 shown in FIG. 1. The process 200 starts at 210.

At 212, the computer system receives an indication of a particular root cause associated with an error condition in an IT system. The IT system may be the IT system 110 shown in FIG. 1. The indication of the particular root cause may be received from a RCA module such as the RCA module 120 shown in FIG. 1.

At 214, the computer system captures activity of an operator for the IT system, where the activity is useful for remedying the particular root cause. The captured activity may include, for example, recorded keystrokes entered on a keyboard and selections made on a display using a computer mouse. In particular embodiments, capturing the activity of the operator comprises recording what the operator enters into an operator workstation to remedy the particular root cause corresponding to the error condition in the IT system.

At 216, the computer system automatically generates a workflow portion for a generic runbook to make the generic runbook useful for remedying root causes similar to the particular root cause. Generating the workflow portion is at least partially based on the captured activity. The workflow portion may comprise the entire workflow of the generic runbook or may comprise a fraction of the workflow of the generic runbook.

At 218, the computer system stores the generic runbook in a manner that allows retrieval of the generic runbook at least partially based on a root cause similar to the particular root cause. The computer system may store the generic runbook in a runbook repository, such as the runbook repository 140 shown in FIG. 1. At 220, the process 200 ends.

Figure 3:
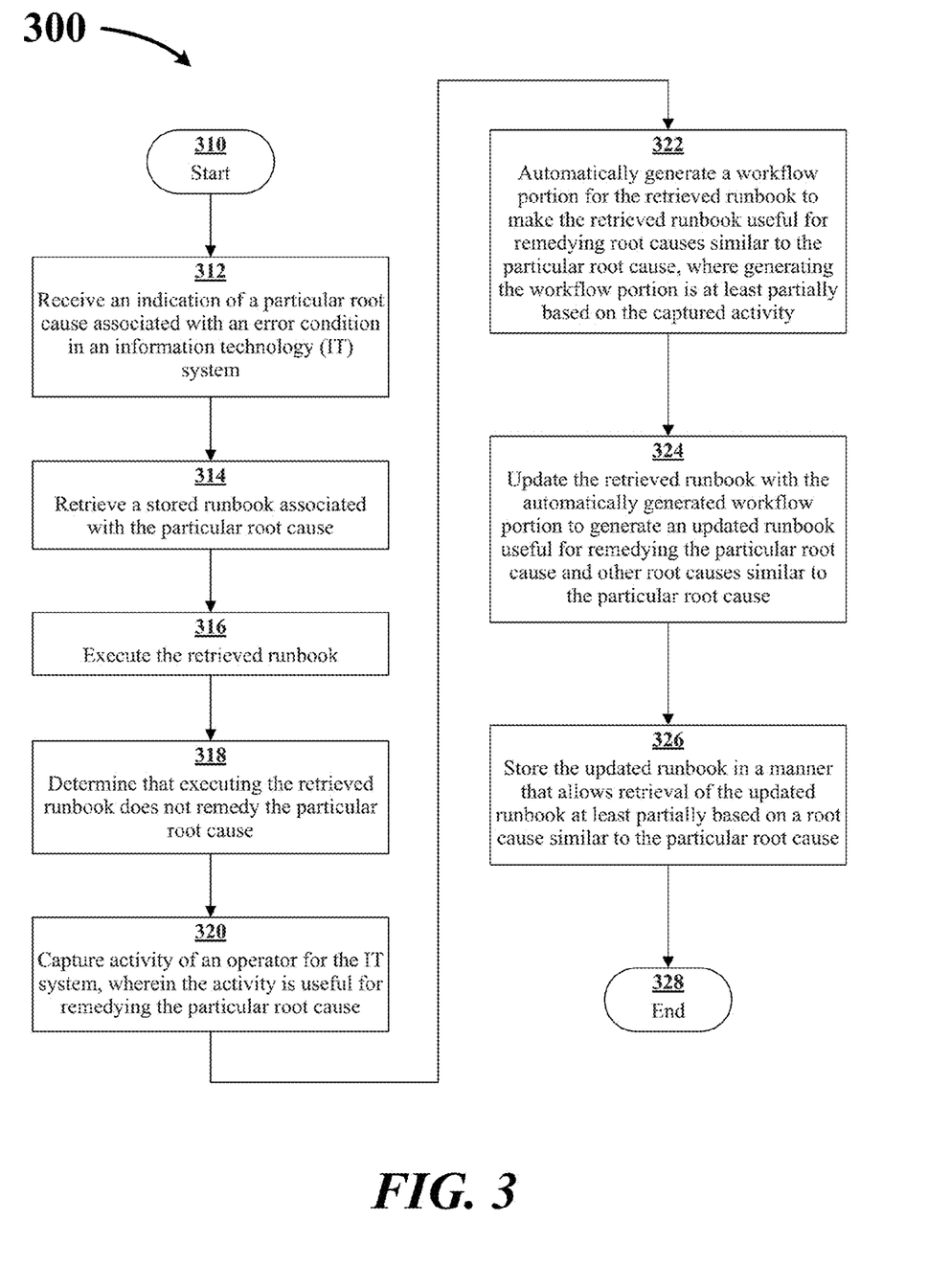
FIG. 3 shows a flow chart of a second process useful for runbook automation.

FIG. 3 shows a flow chart of a process 300 useful for runbook automation. The process 300 may be performed by a computer system, such as the RBA module 130 shown in FIG. 1. The process 300 starts at 310.

At 312, the computer system receives an indication of a particular root cause associated with an error condition in an IT system. The IT system may be the IT system 110 shown in FIG. 1. The indication of the particular root cause may be received from a computer system performing root cause analysis, such as the RCA module 120 shown in FIG. 1.

At 314, the computer system retrieves a stored runbook associated with the particular root cause. The computer system may retrieve the runbook from a runbook repository, such as the runbook repository 140 shown in FIG. 1. In particular embodiments, the computer system queries a runbook repository for a runbook associated with the type of the particular root cause.

At 316, the computer executes the retrieved runbook. At 318, the computer system determines that executing the retrieved runbook does not remedy the particular root cause. For example, the retrieved runbook may have been generated to handle root causes of the same type as the particular root cause, but the retrieved runbook may be unable to completely remedy this particular root cause. In some embodiments, there may be several paths by which the RBA execution may not reach a satisfactory conclusion. In a particular embodiment, the processed output from one step has no matching next step in the workflow. In this embodiment, the RBA may return control to the operator asking for an additional control path to be added to the overall workflow.

At 320, the computer system captures activity of an operator for the IT system, where the activity is useful for remedying the particular root cause. The captured activity may include, for example, recorded keystrokes entered on a keyboard and selections made on a display using a computer mouse. In particular embodiments, capturing the activity of the operator comprises recording what the operator enters into an operator workstation to remedy the particular root cause corresponding to the error condition in the IT system.

At 322, the computer system automatically generates a workflow portion for the retrieved runbook to make the retrieved runbook useful for remedying the particular root cause. Generating the workflow portion is at least partially based on the captured activity.

At 324, the computer system updates the retrieved runbook with the automatically generated workflow portion to generate an updated runbook useful for remedying the particular root cause and other root causes similar to the particular root cause. The workflow portion may comprise the entire workflow of the updated runbook or may comprise a fraction of the workflow of the updated runbook.

At 326, the computer system, stores the updated runbook in a manner that allows retrieval of the updated runbook at least partially based on a root cause similar to the particular root cause. The computer system may store the updated runbook in a runbook repository, such as the runbook repository 140 shown in FIG. 1. At 328, the process 300 ends.

Figure 4:
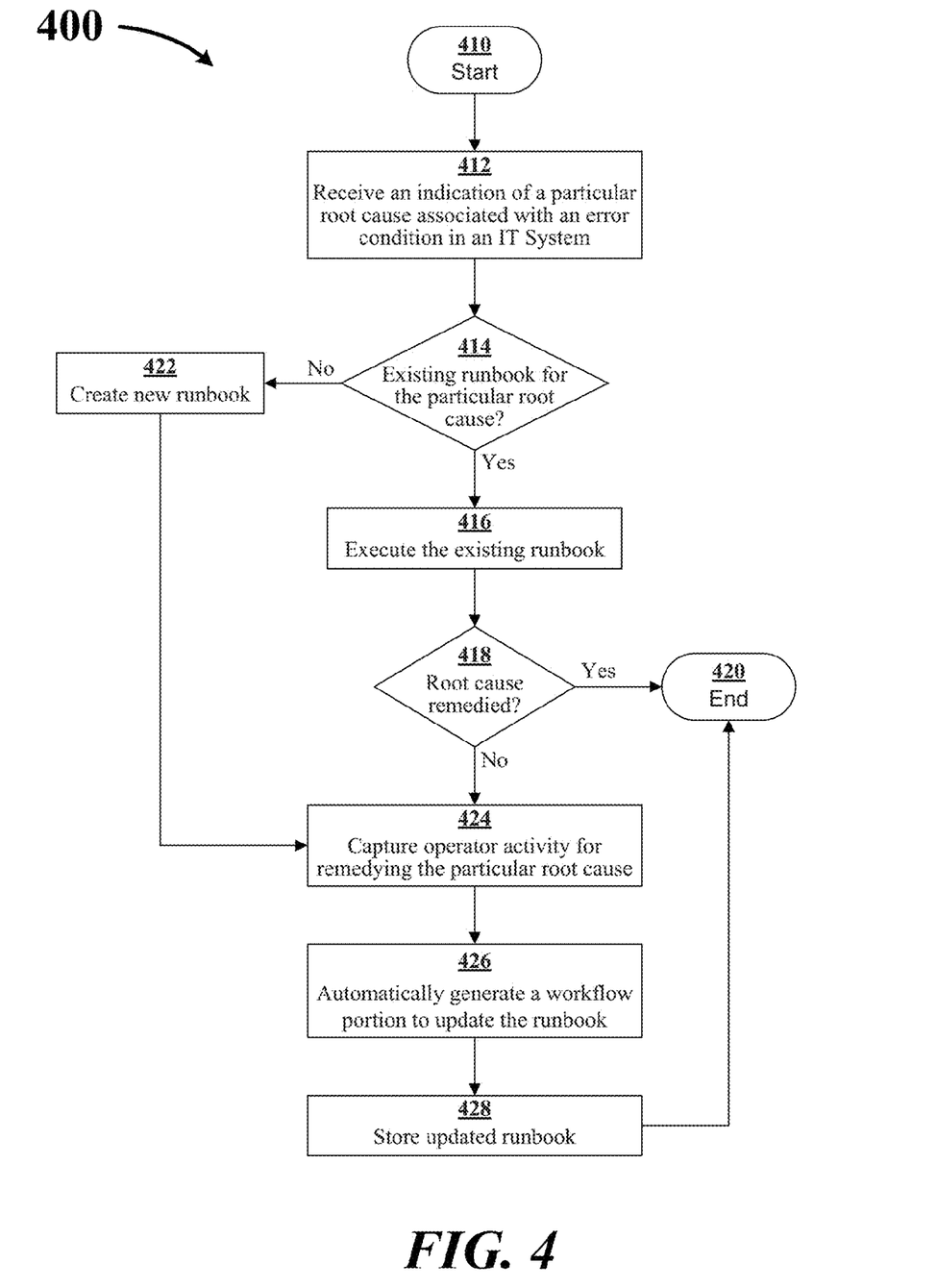
FIG. 4 shows a flow chart of a third process useful for runbook automation.

FIG. 4 shows a flow chart of a process 400 useful for runbook automation. The process 400 may be performed by a computer system, such as the RBA module 130 shown in FIG. 1. The process 400 starts at 410.

At 412, the computer system receives an indication of a particular root cause associated with an error condition in an IT system. The IT system may be the IT system 110 shown in FIG. 1. The indication of the particular root cause may be received from a computer system performing root cause analysis, such as the RCA module 120 shown in FIG. 1.

At 414, the computer system determines whether a runbook corresponding to the particular root cause exists. In particular embodiments, the computer system determines whether a runbook exists by querying a runbook repository, such as the runbook repository 140 shown in FIG. 1. The runbook repository may be a database that allows the computer system to search for a runbook associated with root causes of a particular type. If the computer system determines that there exists no runbook corresponding to the particular root cause, then the process 400 continues to 422. If the computer system determines that there exists a runbook corresponding to the particular root cause, then the process 400 continues to 416.

At 422, the computer system creates a new runbook. In particular embodiments, the new runbook is created from a runbook template. After creating the new runbook, the process 400 continues to 424.

At 416, the computer system executes the existing runbook. At 418, the computer system determines whether executing the runbook remedied the particular root cause. In particular embodiments, the root cause is remedied if the corresponding error condition is removed. If the root cause is remedied, the process 400 continues to 420 and ends. If the root cause is not remedied, the process 400 continues to 424.

At 424, the computer system captures operator activity for remedying the particular root cause. The captured activity may include, for example, recorded keystrokes entered on a keyboard and selections made on a display using a computer mouse. In particular embodiments, capturing the activity of the operator comprises recording what the operator enters into an operator workstation to remedy the particular root cause corresponding to the error condition in the IT system.

At 426, the computer system automatically generates a workflow portion to update the runbook. The runbook may be the new runbook created at 422 or the existing runbook executed at 416.

At 428, the computer system stores the updated runbook. The updated runbook may be stored in a runbook repository as described above. At 420, the process 400 ends.

Figure 5:
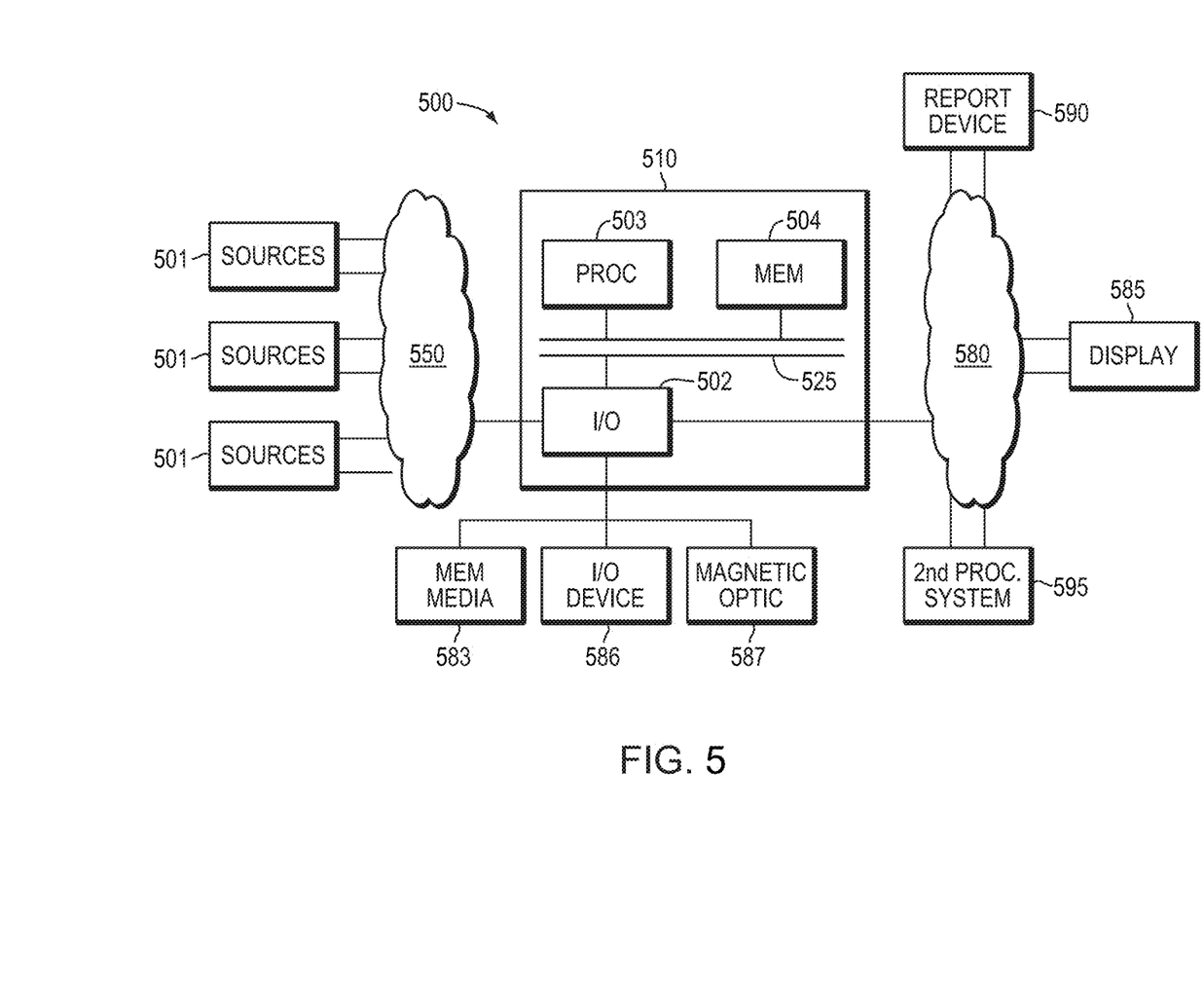
FIG. 5 shows an embodiment of the current invention as loaded on a computer.
Figure 6:
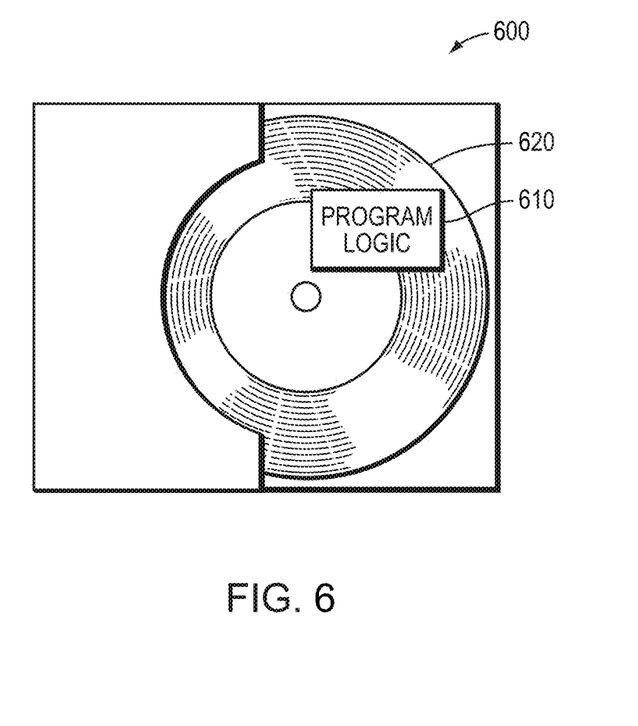
FIG. 6 shows an embodiment of a method of the current invention embodied as program code or a program product.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine of FIG. 5 can be transformed into a special purpose digital machine. FIG. 6 shows Program Logic 610 embodied on a computer-readable medium 620 as shown, and wherein the Logic is encoded in computer-executable code configured for carrying out the reservation service process of this invention and thereby forming a Computer Program Product 600.

The logic for carrying out the method may be embodied as part of the system described below, which is useful for carrying out a method described with reference to embodiments shown in, for example, FIG. 1 and FIG. 3. For purposes of illustrating the present invention, the invention is described as embodied in a specific configuration and using special logical arrangements, but one skilled in the art will appreciate that the device is not limited to the specific configuration but rather only by the claims included with this specification.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

The above-disclosed subject matter is to be considered illustrative, and not restrictive, and the appended claims are intended to cover all modifications, enhancements, and other embodiments, that fall within the true scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    one or more processors;
    a runbook repository enabled to contain a set of runbook automation workflows;

wherein a runbook automation flow is a series of non-human readable operational procedures executable by a computer to remedy the root cause of an error;
a runbook analysis module;
a root cause analysis module; and
computer executable logic enabled to be executed across the one or more processors of:
  detecting an error by the root cause analysis module without user input;
  in response to detection of the error, determining the root cause of the error without user input;
  notifying the runbook analysis module of the error without user input;
  determining, without user input, if a portion of a runbook automation flow in the runbook repository corresponds to the error;
  based on a negative portion that no portion of a runbook corresponds to the root cause:
    capturing user activity of a user correcting the error;
    automatically generating, without user input via the computer system, a new runbook automation flow portion based on captured user activity; and
      storing the new runbook automation flow portion, without user input via the computer system, in the runbook repository; wherein the new runbook automation flow portion is associated with the determined root cause of the error; and
      enabling automatic retrieval and execution of the new runbook automation flow portion, without user interaction, based on identification of a second error with a second root cause similar to the first root cause.

2. The system of claim 1 wherein the logic if further enabled to:
  based on a positive determination that a particular portion of a particular runbook automation flow in the runbook repository corresponds to the error, automatically retrieving and executing the particular portion of the particular runbook automation flow without user interaction.

3. The system of claim 2 wherein the logic is further enabled to:
  detecting a second error;
  determining a second root cause of the second error;
  sending a notification of the root cause of the error to the runbook repository;
  determining if any portion of any runbook automation flow exists is associated with the second root cause; and;
  based on a determination that a particular portion of a particular runbook automation flow is associated with the second root cause, triggering without user interaction, the execution of the particular portion of the particular runbook automation flow.

4. The system of claim 2 wherein the logic is further enabled to:
  determining if the particular portion of the runbook automation flow automatically corrected the error; and
  based on a determination that the automatic execution of the particular runbook automation flow did not remedy the error;
    determining a new root cause of the error;
    automatically generating, via the computer system and without human interaction, a further runbook automation flow portion based on the captured activity; and
    storing the further runbook automation flow portion, via the computer system, in the runbook repository; wherein the further runbook automation flow portion is associated with the new root cause of the error; and
    enabling automatic retrieval and execution of the further runbook automation flow portion, without user interaction, based on identification of a third error with a root cause similar to the new root cause.

5. The system of claim 2 wherein the new runbook automation flow portion is an automatable format executable by a computer without human interaction.

6. The system of claim 1 wherein a workflow, generator uses a semantic model and bases the generating the new runbook automation flow at least partially on the semantic model.

7. The system of claim 1 wherein a workflow, generator uses a state machine model and bases the generating the new runbook automation flow at least partially on the state machine model wherein each procedure in the runbook automation flow represents a node in the state machine model.

8. A method comprising:
  detecting, without user input, an error in an IT system;
  in response to detection of the error and without user input, determining the root cause of the error;
  notifying a runbook analysis module of the error;
  determining if a portion of a runbook in a runbook repository corresponds to the error;
  wherein the runbook repository is enabled to contain a set of runbook automation workflows; wherein a runbook automation flow is a series of non-human readable operational procedures executable by a computer to remedy the root cause of an error;
  based on a negative portion that no portion of a runbook corresponds to the root cause:
  capturing user activity of a user correcting the error;
  automatically generating, without user input via the computer system, a new runbook automation flow portion based on captured user activity;
  storing the new runbook automation flow portion, via the computer system, in the runbook repository; wherein the new runbook automation flow portion is associated with the determined root cause of the error; and
  enabling automatic retrieval and execution of the new runbook automation flow portion, without user interaction, based on identification of a second error with a second root cause similar to the first root cause.

9. The method of claim 8 further comprising:
  based on a positive determination that a particular portion of a particular runbook automation flow in the runbook repository corresponds to the error, automatically retrieving and executing the particular portion of the particular runbook automation flow without user interaction.

10. The method of claim 9 further comprising:
  detecting a second error;
  determining a second root cause of the second error;
  sending a notification of the root cause of the error to the runbook repository;
  determining if any portion of any runbook automation flow exists is associated with the second root cause; and;
  based on a determination that a particular portion of a particular runbook automation flow is associated with the second root cause, triggering without user interaction, the execution of the particular portion of the particular runbook automation flow.

11. The method of claim 9 further comprising:
determining if the particular portion of the runbook automation flow automatically corrected the error; and
based on a determination that the automatic execution of the particular runbook automation flow did not remedy the error;
determining a new root cause of the error;
automatically generating, via the computer system and without human interaction, a further runbook automation flow portion based on the captured activity;
storing the further runbook automation flow portion, via the computer system, in the runbook repository;
wherein the further runbook automation flow portion is associated with the new root cause of the error; and
enabling automatic retrieval and execution of the further runbook automation flow portion, without user interaction, based on identification of a third error with a root cause similar to the new root cause.

12. The method of claim 8 wherein the new runbook portion is an automatable format executable by a computer without human interaction.

13. The method of claim 8 wherein a workflow generator uses a semantic model and bases the generating the new runbook automation flow at least partially on the semantic model.

14. The system of claim 8 wherein a workflow generator uses a state machine model and bases the generating the new runbook automation flow at least partially on the state machine model wherein each procedure in the runbook automation flow represents a node in the state machine model.

15. A computer program product comprising:
a non-transitory computer readable medium encoded with computer executable program, the code enabling:
detecting, without user input, an error in an IT system;
in response to detection of the error and without user input, determining the root cause of the error;
notifying a runbook analysis module of the error;
determining if a portion of a runbook in a runbook repository corresponds to the error;
wherein the runbook repository enabled to contain a set of runbook automation workflows;
wherein a runbook automation flow is a series of non-human readable operational procedures executable by a computer to remedy the root cause of an error; based on a negative portion, that no portion of a runbook corresponds to the root cause:
automatically generating, via the computer system, a new runbook automation flow portion based on captured user activity; and
capturing user activity of a user, correcting the error;
storing the new runbook portion, via the computer system, in the runbook repository; wherein the new runbook automation flow portion is associated with the determined root cause of the error; and
enabling automatic retrieval and execution of the new runbook automation flow portion, without user interaction, based on identification of a second error with a second root cause similar to the first root cause.

16. The computer program product of claim 15 wherein the code further enables:
based on a positive determination that a particular portion of a particular runbook automation flow in the runbook repository corresponds to the error, automatically retrieving and executing the particular portion of the particular runbook automation flow without user interaction.

17. The computer program product of claim 16 wherein the code further enables:
detecting a second error;
determining a second root cause of the second error;
sending a notification of the root cause of the error to the runbook repository;
determining if any portion of any runbook automation flow exists is associated with the second root cause; and;
based on a determination that a particular portion of a particular runbook automation flow is associated with the second root cause, triggering without user interaction, the execution of the particular portion of the particular runbook automation flow.

18. The computer program product of claim 16 wherein the code further enables:
determining if the particular portion of the runbook automation flow automatically corrected the error; and
based on a determination that the automatic execution of the particular runbook automation flow did not remedy the error;
determining a new root cause of the error;
automatically generating, via the computer system and without human interaction, a further runbook automation flow portion based on the captured activity; and
storing the further runbook automation flow portion, via the computer system, in the runbook repository;
wherein the further runbook automation flow portion is associated with the new root cause of the error; and
enabling automatic retrieval and execution of the further runbook automation flow portion, without user interaction, based on identification of a third error with a root cause similar to the new root cause.

19. The computer program product of claim 16 wherein the new runbook automation flow portion is an automatable format executable by a computer without human interaction.

20. The computer program product of claim 16 wherein a workflow generator uses one of a semantic model and bases the generating the new runbook automation flow at least partially on the semantic model; and a state machine model and bases the generating the new runbook automation flow at least partially on the state machine model wherein each procedure in the runbook automation flow represents a node in the state machine model.

* * * * *